Figure 1:
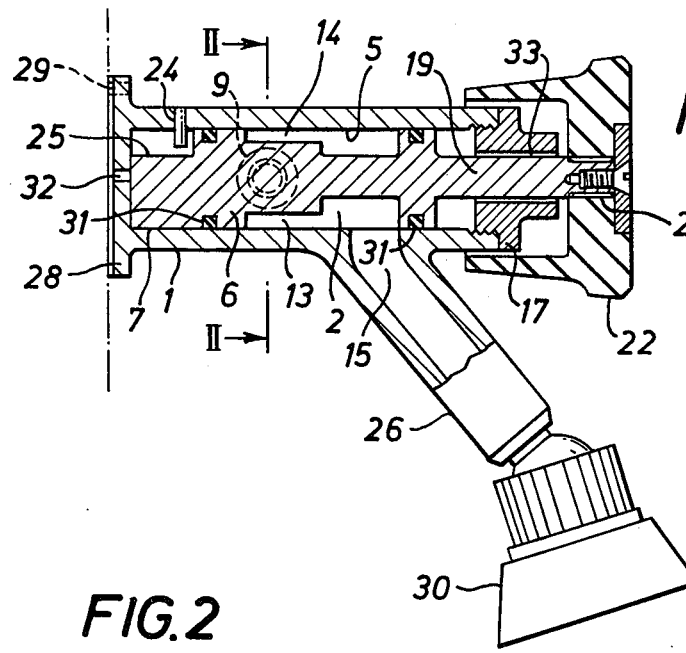

United States Patent [19]
Watts

[11] 4,040,446
[45] Aug. 9, 1977

[54] MIXER TAPS OR VALVES
[75] Inventor: Horace Watts, Pinner, England
[73] Assignee: H. & D. E. Watts, Pinner, England
[21] Appl. No.: 468,656
[22] Filed: May 10, 1974
[51] Int. Cl.² ............................................. F16K 11/07
[52] U.S. Cl. ............................. 137/625.17; 137/625.4
[58] Field of Search .................... 137/625.17, 625.4; 251/175, 625.1, 625.41

[56] References Cited
U.S. PATENT DOCUMENTS

| 375,508 | 12/1887 | Rodman | 137/625.17 |
| 2,604,293 | 7/1952 | Phillips | 251/175 |
| 2,850,041 | 9/1958 | Radanoff | 137/625.41 |
| 2,970,805 | 2/1961 | Pool | 251/175 |
| 3,026,907 | 3/1962 | Klingler | 137/625.17 |
| 3,130,952 | 4/1964 | Meyer | 251/175 |
| 3,168,109 | 2/1965 | Klingler | 137/625.17 X |
| 3,354,910 | 11/1967 | Moen | 137/625.17 |
| 3,497,179 | 2/1970 | Smyers | 251/175 |
| 3,538,952 | 11/1970 | Bayer | 137/625.17 |
| 3,661,181 | 5/1972 | Palmer | 137/625.17 |

Primary Examiner—Alan Cohan
Attorney, Agent, or Firm—Michael J. Striker

[57] ABSTRACT

The invention is concerned with a mixing tap or valve of the kind having a valve body with a cylindrical chamber therein and laterally disposed inlets for respective hot and cold water supplies and at least one outlet for said supplies or a mixture thereof, and complementary valve means in the chamber adapted to cooperate with the inlets or with the inlets and the outlet. The characteristic features of such a mixing valve are that the valve means is movable in two different modes in order respectively, to select or mix the hot and cold water supplies and to vary the volume thereof, and that sealing rings are carried in the valve means and bear slidingly against the cylindrical surface of the chamber and register with the respective inlets when the valve means is moved to a closed position, the sealing rings being respectively housed, in sliding and sealing relationship, in complementary laterally disposed recesses formed in the valve means and which in the closed position of the valve, seal the respective inlets, each sealing ring in said closed position being urged radially against a boundary wall of its associated recess, and axially against the cylindrical surface of the chamber, by the pressure of the water.

11 Claims, 12 Drawing Figures

U.S. Patent  Aug. 9, 1977  Sheet 1 of 3  4,040,446

MIXER TAPS OR VALVES

This invention relates to a mixing valve for combined hot and cold water supplies, the valve being of the kind comprising a valve body having a cylindrical chamber therein with laterally disposed inlets for the respective supplies and at least one outlet for said supplies or a mixture thereof, and complementary valve means in the chamber adapted to cooperate with the inlets or with the inlets and the outlet.

According to the invention, a mixing valve of the kind referred to is characterised in that said valve means is movable in two different modes in order, respectively, to select or mix the said supplies and to vary the volume thereof and in that sealing rings are carried in the valve means and bear slidingly against the cylindrical surface of the chamber and register with the respective inlets when the valve means is moved to a closed position, the said sealing rings being respectively housed, in sliding and sealing relationship, in complementary laterally disposed recesses formed in the valve means and which, in the closed position of the valve, seal the respective inlets, each sealing ring in said closed position being urged radially against a boundary wall of its associated recess, and axially against the cylindrical surface of the chamber, by the pressure of the water.

Figure 2:
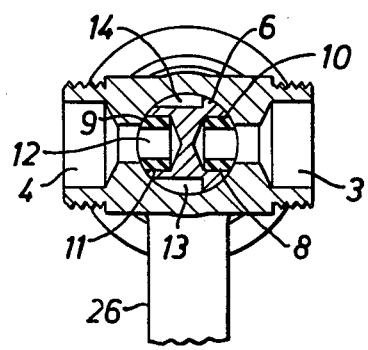
Figure 3:
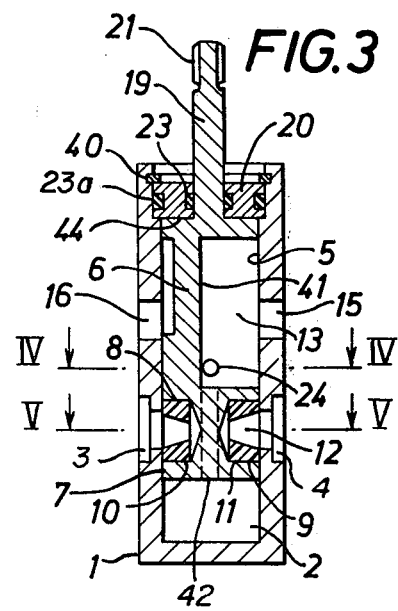
Figure 4:
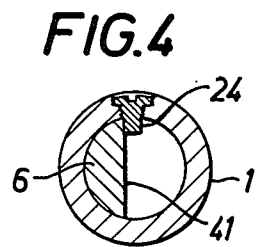
Figure 5:
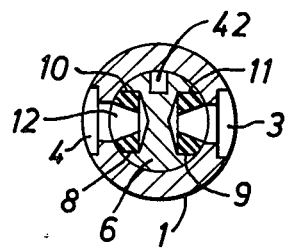
Figure 6:
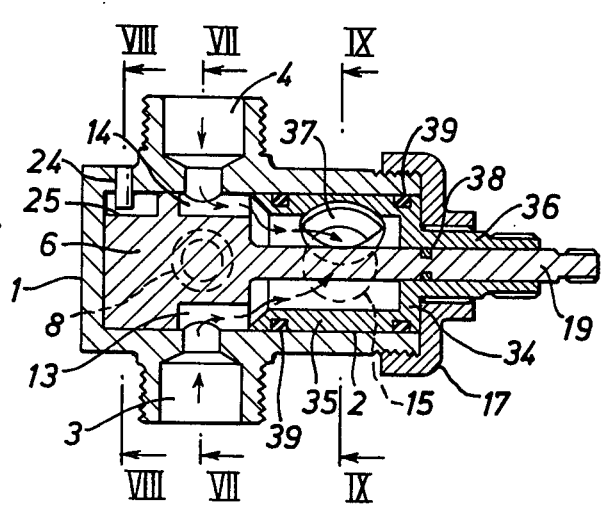
Figure 7:
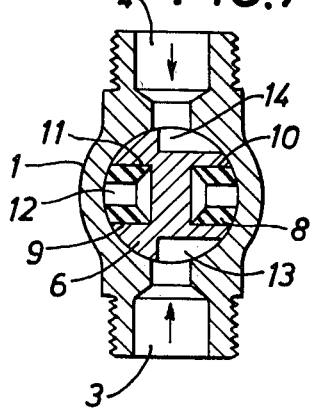
Figure 8:
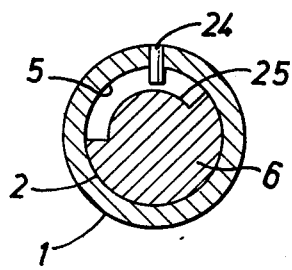
Figure 9:
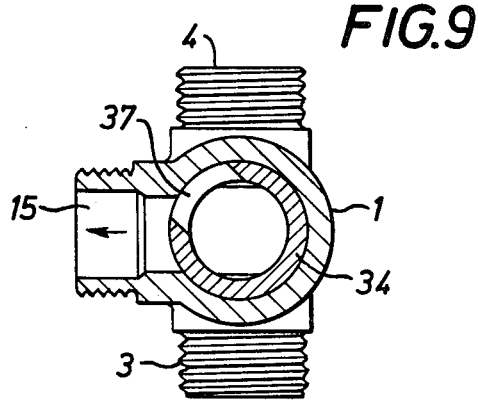
Figure 10:
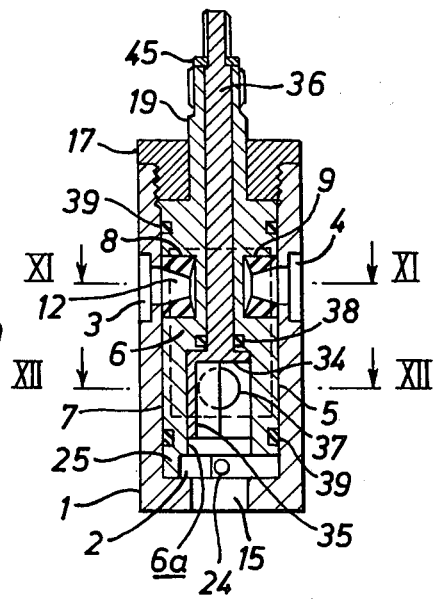
Figure 11:
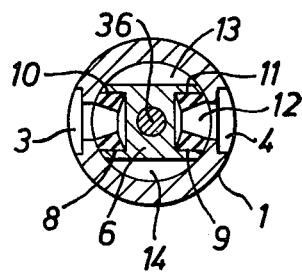
Figure 12:
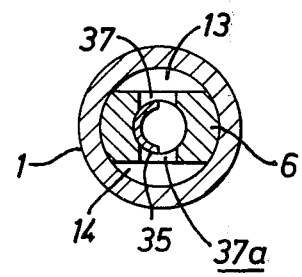

The invention will now be described, by way of example, with reference to the accompanying drawings, in which:

FIG. 1 is a longitudinal sectional view through part of a first embodiment of a mixing valve according to the invention, FIG. 2 is a sectional view on the line II—II in FIG. 1, FIG. 3 is a longitudinal sectional view through part of a second embodiment of a mixing valve according to the invention, FIGS. 4 and 5 are sectional views taken on the lines IV—IV and V—V, respectively, in FIG. 3, FIG. 6 is a longitudinal sectional view through part of a third embodiment of a mixing valve according to the invention, FIGS. 7, 8 and 9 are sectional views taken on the lines VII—VII, VIII—VIII and IX—IX, respectively, in FIG. 6, FIG. 10 is a longitudinal sectional view of part of a fourth embodiment of a mixing valve according to the invention, and FIGS. 11 and 12 are sectional views taken on the lines XI—XI and XII—XII, respectively, in FIG. 10.

FIGS. 1 and 2 show a mixing valve consisting of a housing 1 having a cylindrical valve chamber 2 therein with inlet ports 3, 4, and an outlet port 15, all of which open from the cylindrical surface 5 of the chamber 2.

Arranged for rotation and reciprocation in the chamber 2 is a cylindrical valve member in the form of a piston 6 having a pair of diametrically opposed, radially disposed, blind holes or recesses 10, 11 opening into its cylindrical surface 7, in which are fitted tubular seals 8, 9. Each of the seals 8, 9 is a sliding and sealing fit in its associated recess 10, 11 and bears slidingly against the cylindrical surface 5 of the chamber 2 by virtue of being compressed longitudinally between the bottom end of the recess and the cylindrical surface of the chamber. Furthermore, the inner end of each of the recesses 10, 11 is of conical shape so that water under pressure has access to the inner end face of each of the seals 8, 9 via its respective central passage 12. When the seals 8, 9 are in register with the respective inlets 3, 4 as shown in FIG. 2, water pressure acts on the inner end faces of the seals 8, 9 to further urge the outer ends thereof against the cylindrical surface 5 of the chamber 2, and also acts radially to urge the seals against the boundary walls of the recesses 10, 11 whereby the valve is shut off.

The piston 6 is cut away to provide two longitudinally disposed passages 13, 14 which at one end can communicate respectively with the inlet ports 3, 4, and at the other end communicate with the outlet port 15. A cover cap 17 in screw-threaded engagement with the housing 1, closes the chamber 2 and provides a limit stop for the piston 6 in one direction, the piston being limited for axial movement in the opposite direction by the bottom end wall 28 of the chamber 2.

O-rings 31 disposed in complementary circumferential grooves formed in the piston 6 are located adjacent the respective ends of the piston and serve to prevent leakage to atmosphere and to balance the piston hydraulically in all positions. The piston 6 has a spindle 19 which extends through the cover cap 17 for the attachment of a handle 22, the spindle 19 and the handle 22 having complementary mating serrations 21. At its end remote from the end wall 28, the chamber 2 is vented to atmosphere by an annulus 33, and a vent hole 32 is provided through the wall 28.

A stop pin 24 is secured in the housing 1 so that it projects radially into the chamber 2. A part-circumferential recess 25 formed in the surface 7 of the piston 6 at its end disposed adjacent to the chamber wall 28 cooperates with the pin 24 to limit rotation of the piston to between two angularly spaced positions corresponding respectively to the "closed" position and the "hot water" position of the valve.

The end wall 28 of the housing 1 is flanged, the flange having holes 29 therein for the reception of screws (not shown) for fixing the valve to a wall (shown by a chain line in FIG. 1). The outlet port 15 communicates with a spout 26, which is formed to take a shower rose 30.

The valve is shown in the closed position, and may be opened by rotating the handle 22 counter-clockwise as viewed in FIG. 2, whereby cold water will first flow from the spout 26 via inlet port 4, passage 14 and outlet port 15. Further rotation of the handle 22 in the same direction allows hot water to enter the valve chamber 2 via inlet port 3 and the passage 13, so that mixed water flows from the spout 26. Still further rotation of the handle 22 in the same direction closes communication between the inlet port 4 and the passage 14, so that hot water only flows from the spout 26. The volume of the discharge may be varied (i.e. lessened) by moving the handle axially outwards. To close the valve, the handle 22 is pushed in and then rotated to the closed position, or first rotated to the corresponding angular position and then pushed in.

One of the main advantages of the valve of FIGS. 1 and 2 lies in the fact that it is impossible for an operator to open the valve and immediately get scalding hot water, and in practice at least in respect of a shower valve, the stop pin 24 and the recess 25 in the piston 6 may be arranged to set a limit to the temperature of the water discharged.

FIGS. 3 to 5 show a second embodiment of the invention which is similar in certain respects to the valve shown in FIGS. 1 and 2, but which differs therefrom in certain other respects. Only the said differences will now be described and like items carry like reference numerals.

The valve of FIGS. 3 to 5 consists of a housing in the form of a sleeve 1, the interior of which provides a chamber 2 having two inlet ports 3, 4 and two outlet ports 15, 16 which are spaced longitudinally from the inlet ports.

A valve member in the form of a piston 6 is arranged for rotation and reciprocation in the chamber 2 and, as in FIGS. 1 and 2, carries sealing rings 8, 9 which, in the closed position of the valve (not shown), register with the inlet ports 4, 3 respectively, to shut off the valve.

In this embodiment, however, in order fully to open the valve the piston 6 is first moved axially inwards and then rotated or vice versa, which is the converse of the action of the piston 6 of the valve shown in FIGS. 1 and 2. The piston 6 is provided with a recessed portion 41 which, upon movement of the piston axially inwards, cooperates with either or both of the inlet ports 3, 4 whereafter the piston 6 may be rotated to select or mix the hot and cold water at a rate of discharge dictated by the axial positioning of the piston.

The piston 6 has a stem 19 at its outer end which extends through a seal holder 20 for attachment of a handle (not shown). The seal holder 20 is spigoted into the chamber 2 and is provided with inner and outer O-rings 23, 23a respectively which seal the chamber 1 and the stem 19 with respect to the atmosphere. A snap-ring or circlip 40 provided axially outwardly of the seal holder 20 holds the seal holder axially in position.

A pin 24 secured in the sleeve 1 cooperates with the recessed portion 41 to limit rotation of the piston to between two angularly spaced positions and the axially inner end of the piston 6 has a slot 42 provided in its cylindrical surface to enable the said axially inner end to pass the pin 24 on assembly of the piston into the chamber 2.

In the embodiment the piston 6 is hydraulically unbalanced because the cross-sectional area of the axially inner end of the piston is greater than the cross-sectional area of the annular surface 44 at the axially outer end of the piston. Effectively the difference between these area is equivalent to the cross-sectional area of the stem 19 and by keeping the diameter of the stem 19 small (typically of the order of 6 mms) such an arrangement is entirely feasible as the out-of-balance force is cancelled out by the static friction of the seals, and of course not effective when the valve is closed. The arrangement is less complicated and therefore less expensive than is for example a balanced arrangement of the kind exemplified in FIGS. 1 and 2.

The housing or sleeve 1 may be inserted into a tap or valve body having complementary inlet and outlet passages, and the two outlet ports 15, 16 may, for example, lead to a bath nozzle and shower rose, respectively.

FIGS. 6 to 9 show a third embodiment of the invention. As in the previous embodiments the valve comprises a valve member 6 which is rotated by a handle (not shown) to open the valve and to control the temperature of the flow, and which is provided with tubular seals 8, 9 which shut off the valve when brought into register with the laterally disposed inlet ports 3, 4.

Valve member 6 has two passages 13, 14 for the respective streams of hot and cold water which, at one end can communicate with the inlet ports 3, 4 and at the other end communicate with a laterally disposed port 15, spaced axially from the inlet ports 3, 4. The passages 13, 14 are shown in equal amounts of register with the inlet ports 3, 4 so that in this angular position of the valve member 6 the valve will supply equal amounts of hot and cold water (i.e. tepid water), assuming equal inlet pressures of the hot and cold water supplies.

Rotatable in chamber 2 is a second valve member or throttle member 34 comprising a cylindrical sleeve 35 having a tubular spindle 36 coaxially surrounding the spindle 19 of the valve member 6. The sleeve 35 is a sliding fit in the chamber 2 and has an aperture 37 which, on rotation of the throttle member, cooperates with the outlet port 15 to vary the flow of water therethrough. The spindles 19 and 36 are sealed with respect to each other by an O-ring 38 and extend through a cover cap 17 screwed onto one end of the housing 1, for connection, respectively, to two coaxially disposed operating handles (not shown).

O-rings 39 are provided between the sleeve 35 and chamber 2 respectively to prevent water leaking from the upper end of the valve to atmosphere, and water by-passing the aperture 37 in sleeve 35.

In operation, selection or mixture of the hot and cold water is effected by rotating the valve member 6, and the volume of the discharge is controlled by rotating the throttle member 34. Thus the temperature of the discharge can be varied without substantially changing the total amount of water flowing, and conversely the total amount of water flowing can be varied without substantially changing the temperature thereof.

Each of the control handles can be operated without affecting the setting of the other. When valve member 6 is rotated, the throttle member 34 does not rotate because the large O-rings 39 provide a much larger degree of friction than does the small O-ring 38. Conversely, when the throttle member 34 is rotated, the valve member 6 is held stationary by the tubular seals 8, 9.

The angular travel of the valve member 6 is limited to between two angularly spaced positions corresponding to closed and hot water positions, by the cooperation of a partcircumferential recess 25 in the surface of the valve member 6 with a radially-disposed pin 24 fixed in the valve body 1 and projecting into chamber 2.

A fourth embodiment of the valve according to the invention, shown in FIGS. 10 to 12, is similar to the valve shown in FIGS. 6 to 9, in as much as it comprises two independently rotatable valve members 6, 34. In this embodiment, however, the first stage member 6 containing the tubular seals 8, 9 controls the volume of the discharge and effects shut-off, and temperature is controlled by the second stage member 34, which is the converse of the arrangement shown in FIGS. 6 to 9.

Rotation of the first stage member 6 from the closed position shown in FIGS. 10 to 12 allows hot and cold water to flow respectively into two side chambers 13, 14 (see FIG. 12), whence the two unmixed streams of water flow respectively to two orifices 37, 37a formed in the lower end of the first stage member 6.

The first stage member 6 has a bore 6a formed in its lower end into which the orifices 37, 37a open, and the second stage member 34 comprises a semi-circular portion 35 which cooperates with bore 6a to block the orifices 37, 37a in equal inverse proportions on rotation of the second stage member 34.

The second stage member 34 comprises a spindle 36 which passes coaxially through the member 6 to the exterior of the valve for attachment of a handle (not shown), and the first stage member 6 also has a spindle 19 extending from the valve onto which a second handle (not shown) is fixed coaxially with the first handle. The two valve members 6, 34 are sealed with respect to each other by an O-ring 38, and are secured together by a circlip 45.

In operation, and assuming the first stage member 6 to be rotated 180° from the shut-off position shown in FIGS. 10 to 12, hot and cold water will flow in equal amounts into chambers 13, 14 and thence equally through each orifice 37, 37a so that the valve will supply equal amounts of hot and cold water (i.e. tepid water) with of course the second stage member 34 remaining in the position shown.

By rotating the second stage member 34 through 90° clockwise or anticlockwise from the relative position shown in FIG. 12, the temperature of the discharge will be changed to all hot or all cold, depending on how the valve is connected up, but the overall volume of the discharge will not change substantially.

Correspondingly, if the first stage member 6 is then rotated the volume of the water discharged will be varied, without any substantial change in temperature occurring, and the valve may be shut-off by rotating the first stage member 6 to the fully closed position shown in FIGS. 10 to 12.

It will be observed that, due to the balance of seal friction, when the first stage member 6 is rotated the second stage member will rotate with it, and conversely, when the second stage member 34 is rotated, the first stage member will remain stationary.

It is not intended that the invention be limited solely to the embodiment illustrated and described herein. For example, as in known valves, the valve means could consist of two elements, one being movable axially and the other rotatably or rotatably and axially, and such valve means could be controlled by a single handle movable in two directions or by two concentrically disposed handles. Also, the tubular seals may be made slightly ellipsoid or ovoid, or other non-circular shape, so as to prevent them turning on their own axes.

What is claimed is:

1. A hot and cold water mixing and flow control valve, comprising means forming a housing having a valve chamber therein with a cylindrical bore of a specific diameter; inlet means in said housing means connectible to hot and cold water supplies and including a hot water inlet and a cold water inlet opening laterally into said bore; outlet means in said housing means for discharging said supplies to atmosphere, including an outlet opening into said valve chamber; valve means movable relative to said housing means comprising an actuating means and a generally cylindrical valve member, the valve member being disposed in said bore and movable angularly around said bore and axially along said bore by the actuating means, to control separately the temperature and the rate of flow of the discharge, and the actuating means being operable in two separate modes corresponding respectively to said angular and axial modes of movement of the valve member, and also being operable to a particular axial/angular closed position in which the valve is closed; sealing means between the valve means and the housing means effective to isolate the inlets with respect to each other and with respect to said outlet means; stop means on the valve means and on the housing means for limiting the angular and axial travel of the valve member; said valve member being movable from said particular closed position to the medial axial/angular coordinate open position thereof only by operation of the actuating means in its two modes of movement, and not being movable from said closed position without effecting immediate opening of the valve.

2. A hot and cold water mixing and flow control valve as claimed in claim 1, wherein: said valve member includes a stem of circular cross-section, of smaller diameter than said bore, which passes through one end of said valve chamber for connection to said actuating means; said sealing means comprises a sealing device positioned between the housing means and said stem and providing a seal around said stem for preventing leakage of water along the stem from the valve chamber to atmosphere, and defining a pressure effective area; and said valve member has transverse surfaces providing opposed areas of different magnitude which communicate with at least one of said inlets whenever said valve member is moved from said closed position, the difference in magnitude of said areas being equal to said pressure effective area irrespective of the diameter chosen for said bore; whereby said valve member is biased axially by a nett force equal to the difference of the forces generated by the pressure of water acting on said opposed surfaces, said valve having an inbuilt frictional drag provided at least in part by said sealing members and said sealing device sufficient to prevent the valve member shifting axially inadvertently under the influence of water pressure.

3. A hot and cold water mixing and flow control valve as claimed in claim 2, wherein said transverse surfaces and said sealing device remain in communication with said outlet means when said valve member is moved to said closed position, whereby said transverse surfaces and said sealing device will be relieved of the pressure of said water supplies.

4. A hot and cold water mixing and flow control valve as claimed in claim 2, in which said sealing device is of a self-energizing nature and defines a pressure effective area not exceeding that of a circle of 6 mm diameter, in order to limit said nett force and so limit the degree of frictional drag it is necessary to have to prevent said inadvertent axial movement of the valve member.

5. A hot and cold water mixing and flow control valve as claimed in claim 4, wherein said sealing device is an O-ring.

6. A hot and cold water mixing and flow control valve as claimed in claim 2, wherein a portion of said stem moves in said sealing device as said valve member is moved axially by the actuating means, whereby the cross-sectional area of said stem portion equates with said pressure effective area defined by said sealing device.

7. A hot and cold water mixing and flow control valve as claimed in claim 2, wherein said valve member, when moved axially but not angularly from said closed position, effects the opening of only said cold water inlet.

8. A hot and cold water mixing and flow control valve as claimed in claim 1, wherein said valve member, when moved angularly but not axially from said closed position, effects the opening first of said cold water inlet and then of said hot water inlet.

9. A hot and cold water mixing and flow control valve, comprising means forming a housing having a valve chamber therein with a cylindrical bore of a specific diameter; inlet means in said housing means connectible to hot and cold water supplies and including a hot water inlet and a cold water inlet opening laterally into said bore; outlet means in said housing means for discharging said supplies to atmosphere, including an outlet opening into said valve chamber; valve means movable relative to said housing means comprising an actuating means and a generally cylindrical valve member, the valve member being disposed in said bore and movable angularly around said bore and axially along said bore by the actuating means, to control separately the temperature and the rate of flow of the discharge, and the actuating means being operable in two separate modes corresponding respectively to said angular and axial modes of movement of the valve member, and also being operable to a particular axial/angular closed position in which the valve is closed; sealing means between the valve means and the housing means effective to isolate the inlets with respect to each other and with respect to said outlet means and comprising discrete sealing members one for each inlet, engaging the cylindrical surface of said bore, the said sealing members being of tubular form and being disposed one in each of a pair of spaced recesses formed in the valve member; stop means on the valve means and on the housing means for limiting the angular and axial travel of the valve member; said valve member being movable from said particular closed position to the medial axial/angular coordinate open position thereof only by operation of the actuating means in its two modes of movement and not being movable from said closed position without effecting immediate opening of the valve.

10. A hot and cold water mixing and flow control valve as claimed in claim 9, wherein each of said recesses is radially disposed in said valve member and each of said tubular sealing members is disposed in its recess with its radially outer end engaging the cylindrical surface of said bore, each tubular sealing member being compressed radially between the radially inner end of its recess and said cylindrical surface, whereby the outer wall of the tubular sealing member is urged against a boundary wall of its recess.

11. A hot and cold water mixing and flow control valve as claimed in claim 10, wherein the radial distance between said radially inner end of a recess and said cylindrical surface is less than the axial length of said tubular seal when the latter is in an uncompressed condition.

* * * * *